US012614189B2

(12) United States Patent
Gottin et al.

(10) Patent No.: US 12,614,189 B2
(45) Date of Patent: Apr. 28, 2026

(54) EVALUATING CRITICALITY CLASSIFICATIONS OF ITEMS USING BINARY CLASSIFICATION MODELS AND A VALIDATION OF SIMILAR ITEMS

(71) Applicant: Dell Products L.P., Round Rock, TX (US)

(72) Inventors: Vinicius Michel Gottin, Rio de Janeiro (BR); Paulo Abelha Ferreira, Rio de Janeiro (BR); Danilo Ferian Antunes, Rio de Janeiro (BR)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/797,679

(22) Filed: Aug. 8, 2024

(65) Prior Publication Data

US 2026/0044862 A1    Feb. 12, 2026

(51) Int. Cl.
*G06Q 30/00* (2023.01)
*G06F 18/2415* (2023.01)
*G06Q 30/015* (2023.01)

(52) U.S. Cl.
CPC ....... *G06Q 30/015* (2023.01); *G06F 18/2415* (2023.01)

(58) Field of Classification Search
None
See application file for complete search history.

(56) References Cited

U.S. PATENT DOCUMENTS

| | | | |
|---|---|---|---|
| 2021/0156930 A1* | 5/2021 | Kudo | G01R 33/0029 |
| 2022/0076187 A1* | 3/2022 | Blum | G06N 20/00 |
| 2022/0092097 A1* | 3/2022 | Gupta | G06N 3/09 |
| 2024/0202789 A1* | 6/2024 | Albayrak | G06Q 30/0603 |

(Continued)

OTHER PUBLICATIONS

G. A. Di Lucca, M. Di Penta and S. Gradara, "An approach to classify software maintenance requests," International Conference on Software Maintenance, 2002. Proceedings., Montreal, QC, Canada, 2002, pp. 93-102, doi: 10.1109/ICSM.2002.1167756. (Year: 2002).*

(Continued)

*Primary Examiner* — Matthew T Sittner
(74) *Attorney, Agent, or Firm* — Ryan, Mason & Lewis, LLP

(57) ABSTRACT

Techniques are provided for evaluating criticality classifications of items using a binary classification model. One method includes obtaining information characterizing an item having a designated criticality classification; applying at least a portion of the information characterizing the item to an encoder that generates an encoded vector characterizing the item; applying the encoded vector characterizing the item to a binary classification model, wherein the binary classification model identifies candidate false positive items; evaluating the candidate false positive items by comparing the candidate false positive items to similar previously processed items having a validated false positive classification; and initiating an automated action based on a result of the evaluating. The items may comprise customer service tickets that may be labeled with the designated criticality classification by a customer service ticketing system.

20 Claims, 8 Drawing Sheets

(56) References Cited

U.S. PATENT DOCUMENTS

2025/0028986 A1 * 1/2025 Burchard ............... G06N 5/045

OTHER PUBLICATIONS

Rumelhard, D. E. et al., "Learning Representations by Back-Propagating Errors," Cognitive Modeling, vol. 5, Nov. 3, 1998.

Queern, Caleb et al.; The False Positive Conundrum; https://kpmg.com/us/en/articles/2023/false-positive-conundrum.html; downloaded on Aug. 1, 2024.

"Life Cycle of a False Positive"; dtd Feb. 5, 2024; https://docs.servicenow.com/bundle/washingtondc-security-management/page/product/vulnerability-response/concept/vr-false-positive.html; downloaded on Aug. 1, 2024.

* cited by examiner

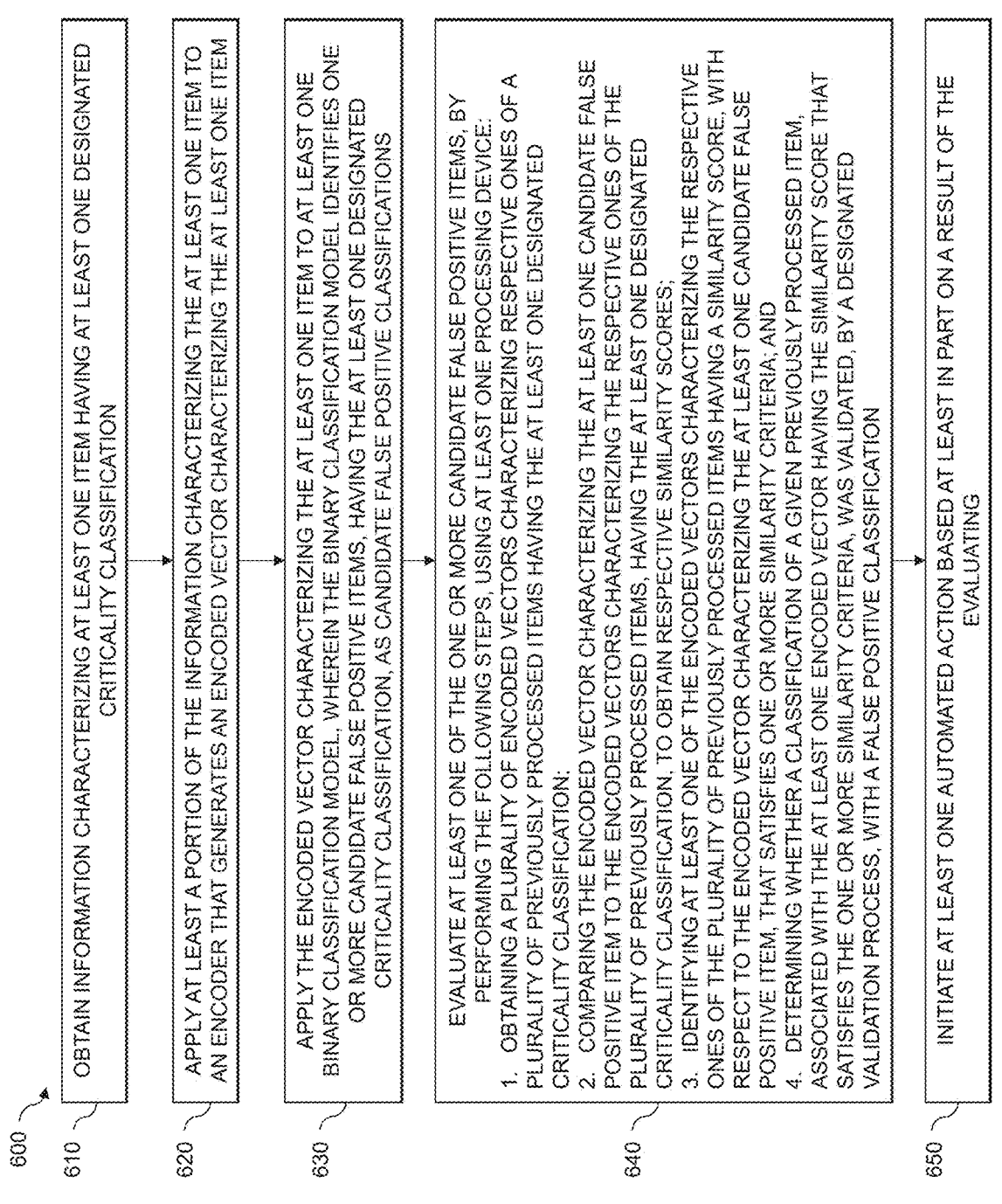

600

610 OBTAIN INFORMATION CHARACTERIZING AT LEAST ONE ITEM HAVING AT LEAST ONE DESIGNATED CRITICALITY CLASSIFICATION

620 APPLY AT LEAST A PORTION OF THE INFORMATION CHARACTERIZING THE AT LEAST ONE ITEM TO AN ENCODER THAT GENERATES AN ENCODED VECTOR CHARACTERIZING THE AT LEAST ONE ITEM

630 APPLY THE ENCODED VECTOR CHARACTERIZING THE AT LEAST ONE ITEM TO AT LEAST ONE BINARY CLASSIFICATION MODEL, WHEREIN THE BINARY CLASSIFICATION MODEL IDENTIFIES ONE OR MORE CANDIDATE FALSE POSITIVE ITEMS, HAVING THE AT LEAST ONE DESIGNATED CRITICALITY CLASSIFICATION, AS CANDIDATE FALSE POSITIVE CLASSIFICATIONS

640 EVALUATE AT LEAST ONE OF THE ONE OR MORE CANDIDATE FALSE POSITIVE ITEMS, BY PERFORMING THE FOLLOWING STEPS, USING AT LEAST ONE PROCESSING DEVICE:
1. OBTAINING A PLURALITY OF ENCODED VECTORS CHARACTERIZING RESPECTIVE ONES OF A PLURALITY OF PREVIOUSLY PROCESSED ITEMS HAVING THE AT LEAST ONE DESIGNATED CRITICALITY CLASSIFICATION;
2. COMPARING THE ENCODED VECTOR CHARACTERIZING THE AT LEAST ONE CANDIDATE FALSE POSITIVE ITEM TO THE ENCODED VECTORS CHARACTERIZING THE RESPECTIVE ONES OF THE PLURALITY OF PREVIOUSLY PROCESSED ITEMS, HAVING THE AT LEAST ONE DESIGNATED CRITICALITY CLASSIFICATION, TO OBTAIN RESPECTIVE SIMILARITY SCORES;
3. IDENTIFYING AT LEAST ONE OF THE ENCODED VECTORS CHARACTERIZING THE RESPECTIVE ONES OF THE PLURALITY OF PREVIOUSLY PROCESSED ITEMS HAVING A SIMILARITY SCORE, WITH RESPECT TO THE ENCODED VECTOR CHARACTERIZING THE AT LEAST ONE CANDIDATE FALSE POSITIVE ITEM, THAT SATISFIES ONE OR MORE SIMILARITY CRITERIA; AND
4. DETERMINING WHETHER A CLASSIFICATION OF A GIVEN PREVIOUSLY PROCESSED ITEM, ASSOCIATED WITH THE AT LEAST ONE ENCODED VECTOR HAVING THE SIMILARITY SCORE THAT SATISFIES THE ONE OR MORE SIMILARITY CRITERIA, WAS VALIDATED, BY A DESIGNATED VALIDATION PROCESS, WITH A FALSE POSITIVE CLASSIFICATION

650 INITIATE AT LEAST ONE AUTOMATED ACTION BASED AT LEAST IN PART ON A RESULT OF THE EVALUATING

FIG. 6

EVALUATING CRITICALITY CLASSIFICATIONS OF ITEMS USING BINARY CLASSIFICATION MODELS AND A VALIDATION OF SIMILAR ITEMS

BACKGROUND

Customer service requests, such as customer support requests, are often documented using tickets. In the field of IT (Information Technology), for example, a ticketing system is often used to manage IT tickets. A processing of such customer service tickets and other items is often prioritized based on a classification of each item.

SUMMARY

Illustrative embodiments of the disclosure provide techniques for evaluating criticality classifications of items, such as customer service tickets, using at least one binary classification model. One method comprises obtaining information characterizing at least one item having at least one designated criticality classification; applying at least a portion of the information characterizing the at least one item to an encoder that generates an encoded vector characterizing the at least one item; applying the encoded vector characterizing the at least one item to at least one processor-based binary classification model, wherein the processor-based binary classification model identifies one or more candidate false positive items, having the at least one designated criticality classification, as candidate false positive classifications; evaluating at least one of the one or more candidate false positive items, by performing the following steps: obtaining a plurality of encoded vectors characterizing respective ones of a plurality of previously processed items having the at least one designated criticality classification; comparing the encoded vector characterizing the at least one candidate false positive item to the encoded vectors characterizing the respective ones of the plurality of previously processed items, having the at least one designated criticality classification, to obtain respective similarity scores; identifying at least one of the encoded vectors characterizing the respective ones of the plurality of previously processed items having a similarity score, with respect to the encoded vector characterizing the at least one candidate false positive item, that satisfies one or more similarity criteria; and determining whether a classification of a given previously processed item, associated with the at least one encoded vector having the similarity score that satisfies the one or more similarity criteria, was validated, by a designated validation process, with a false positive classification; and initiating at least one automated action based at least in part on a result of the evaluating.

Illustrative embodiments can provide significant advantages relative to conventional item processing techniques. For example, technical problems related to such conventional item processing techniques are mitigated in one or more embodiments by using binary classification models and a validation of similar items to ensure that items having at least one designated criticality classification (e.g., a high priority classification) are not improperly labeled as a false positive classification (e.g., items that are classified with a particular designated criticality classification but should have been assigned with a different designated criticality classification).

These and other illustrative embodiments described herein include, without limitation, methods, apparatus, systems, and computer program products comprising processor-readable storage media.

BRIEF DESCRIPTION OF THE DRAWINGS

FIG. 6 is a flow diagram illustrating an exemplary implementation of a process for evaluating criticality classifications of items in accordance with an illustrative embodiment;

DETAILED DESCRIPTION

Figure 1:
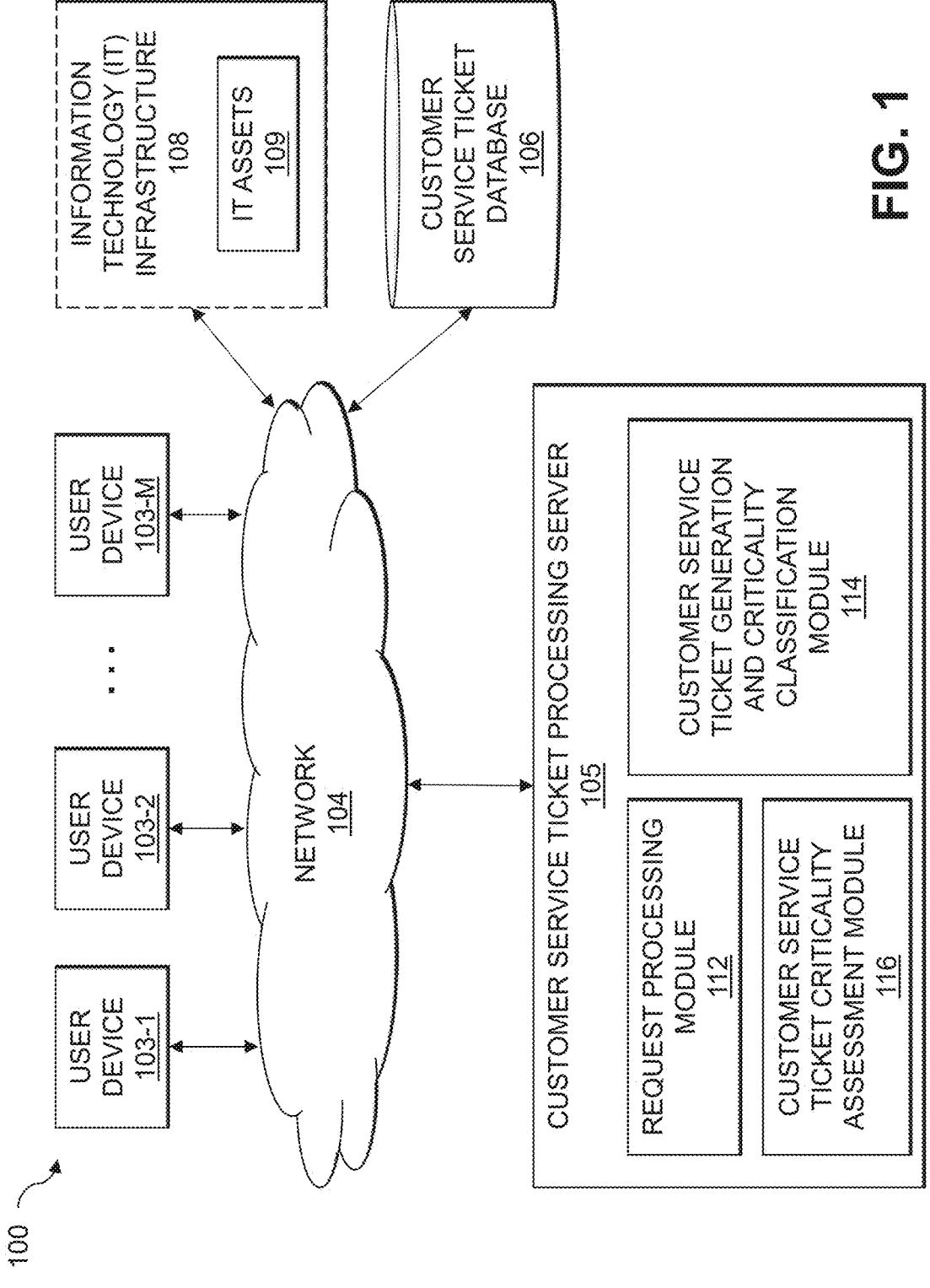
FIG. 1 illustrates an information processing system configured for evaluating criticality classifications of customer service tickets in accordance with an illustrative embodiment.

Illustrative embodiments of the present disclosure will be described herein with reference to exemplary communication, storage and processing devices. It is to be appreciated, however, that the disclosure is not restricted to use with the particular illustrative configurations shown. One or more embodiments of the disclosure provide methods, apparatus and computer program products for evaluating criticality classifications of items, such as customer service tickets, using a binary classification model.

As noted above, customer support requests are often documented using customer service tickets. Such customer service tickets are often the first interaction between a user requesting support and a team responsible for resolving the support issue. Thus, customer service tickets typically include information that the user believes is relevant for the support analysis.

Support ticketing systems (STSs) allow service inquiries and other customer service inquiries to be processed in an efficient manner. Customer service tickets are often classified into criticality levels, for example, according to impact, urgency and/or priority. To ensure high availability, reliability engineers may adhere to stringent Service Level Agreements (SLAs) for customer service tickets that are classified with a high priority classification. These SLAs may define clear expectations and deadlines for response times and issue resolution, thereby ensuring that critical problems receive immediate attention. By following these rigorous guidelines, reliability engineers can promptly identify, troubleshoot, and rectify severe issues, minimizing downtime and maintaining the system's integrity.

It is important that high priority customer service tickets (and other items) are expediently processed. In some situations, high priority customer service tickets may not be automatically closed and must be reviewed by designated personnel. There may be cases of false positive tickets, which are classified as high priority customer service tickets but should not have been (potentially wasting time when personnel could have been resolving customer service tickets with higher priority).

In one or more embodiments, a framework is provided to identify false positives in the priority classification of tickets. In particular, customer service tickets that are classified as high priority tickets are identified as being false positives without (or with a low likelihood of) incurring false negatives. In some embodiments, a self-supervised classification system is employed, where a binary classification model is trained to separate false positive tickets from true positive ones, optionally integrated in a framework for tagging cases and enabling continuous learning based on feedback from one or more operators.

In some embodiments, the disclosed techniques for evaluating criticality classifications of customer service tickets using a binary classification model employ three stages. In a first stage, a labeled customer service ticket data set is generated, for example, using self-supervised techniques in lieu of, or as a complement to human annotation, if any. In a second stage, the binary classification model is trained using an autoencoder to learn a representation of the customer service tickets that ensures good separation between false positive customer service tickets and true positive customer service tickets (sometimes referred to herein as the "latent space"). The latent space may be applied to a support vector machine (SVM) to obtain a final binary classification. In a third stage, the autoencoder and binary classifier models are used to process new (e.g., not previously processed) customer service tickets that have been assigned with a high priority (or another designated criticality classification), to identify new customer service tickets that may have a false positive classification. The new customer service tickets that have been identified as having a possible false positive classification are compared to historical customer service tickets to obtain respective similarity scores. The new customer service tickets that have been identified as having a possible false positive classification may be assigned a false positive classification when similar historical customer service tickets were validated, by a designated validation process, with a false positive classification. The identified false negative cases may be recorded and tracked and a retraining of the autoencoder and/or classifier models may be initiated.

While one or more embodiments of the disclosure are discussed herein in the context of evaluating criticality classifications of customer service tickets, the disclosed techniques may also be applied to evaluate criticality classifications of other types of items, as would be apparent to a person of ordinary skill in the art, based on the present disclosure.

FIG. 1 shows a computer network (also referred to herein as an information processing system) 100 configured in accordance with an illustrative embodiment. The computer network 100 comprises a plurality of user devices 103-1, 103-2, . . . 103-M, collectively referred to herein as user devices 103. The user devices 103 are coupled to a network 104, where the network 104 in this embodiment is assumed to represent a sub-network or other related portion of the larger computer network 100. Accordingly, elements 100 and 104 are both referred to herein as examples of "networks" but the latter is assumed to be a component of the former in the context of the FIG. 1 embodiment. Also coupled to network 104 is one or more customer service ticket processing servers 105 and one or more customer service ticket databases 106, discussed below.

Also coupled to the network 104 is an IT infrastructure 108 comprising one or more IT assets 109. The IT assets 109 may comprise physical and/or virtual computing resources in the IT infrastructure 108. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the customer service ticket processing servers 105 are used for an enterprise system. For example, an enterprise may subscribe to or otherwise utilize the customer service ticket processing servers 105 for managing support of its assets (e.g., IT assets 109 in the IT infrastructure 108). As used herein, the term "enterprise system" is intended to be construed broadly to include any group of systems or other computing devices. For example, the IT assets 109 of the IT infrastructure 108 may provide a portion of one or more enterprise systems. A given enterprise system may also or alternatively include one or more of the user devices 103. In some embodiments, an enterprise system includes one or more data centers, cloud infrastructure comprising one or more clouds, etc. A given enterprise system, such as cloud infrastructure, may host assets that are associated with multiple enterprises (e.g., two or more different businesses, organizations or other entities).

The user devices 103 may comprise, for example, host devices and/or devices such as mobile telephones, laptop computers, tablet computers, desktop computers or other types of computing devices. Such devices are examples of what are more generally referred to herein as "processing devices." Some of these processing devices are also generally referred to herein as "computers." The user devices 103 may comprise a network client that includes networking capabilities such as ethernet, Wi-Fi, etc. When the user devices 103 are implemented as host devices, the host devices may illustratively comprise servers or other types of computers of an enterprise computer system, cloud-based computer system or other arrangement of multiple compute nodes associated with respective users.

For example, the host devices in some embodiments illustratively provide compute services such as execution of one or more applications on behalf of each of one or more users associated with respective ones of the host devices.

The user devices 103 in some embodiments comprise respective processing devices associated with a particular company, organization or other enterprise or group of users. In addition, at least portions of the computer network 100 may also be referred to herein as collectively comprising an "enterprise network." Numerous other operating scenarios involving a wide variety of different types and arrangements of processing devices and networks are possible, as will be appreciated by those skilled in the art.

It is to be appreciated that the term "user" in this context and elsewhere herein is intended to be broadly construed so as to encompass, for example, human, hardware, software or firmware entities (including services), as well as various combinations of such entities. Compute and/or storage services may be provided for users under a Platform-as-a-Service (PaaS) model, a Storage-as-a-Service (StaaS) model, an Infrastructure-as-a-Service (IaaS) model and/or a Function-as-a-Service (FaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The user devices 103 are configured to access or otherwise utilize the IT infrastructure 108. In some embodiments, the user devices 103 are assumed to be associated with system administrators, IT managers or other authorized personnel responsible for managing the IT assets 109 of the IT infrastructure 108. For example, a given one of the user devices 103 may be operated by a user to access a graphical user interface (GUI) provided by the customer service ticket processing server 105 to manage one or more of the IT assets 109 of the IT infrastructure 108. The customer service ticket processing server 105 may be provided as a cloud service that is accessible by a given user device 103 to allow the user thereof to manage one or more of the IT assets 109 of the IT infrastructure 108. In some embodiments, the IT assets 109 of the IT infrastructure 108 are owned or operated by the same enterprise that operates the customer service ticket processing server 105 (e.g., where an enterprise such as a business provides support for the assets it operates). In other embodiments, the IT assets 109 of the IT infrastructure 108 may be owned or operated by one or more enterprises different than the enterprise which operates the customer service ticket processing server 105 (e.g., a first enterprise provides support for assets that are owned by multiple different customers, business, etc.). Various other examples are possible.

As shown in FIG. 1, an exemplary customer service ticket processing server 105 may comprise a request processing module 112, a customer service ticket generation and criticality classification module 114, and a customer service ticket criticality assessment module 116. In some embodiments, the request processing module 112 assigns a numerical vectorial representation to each customer service ticket to encode a respective customer service ticket in an encoded space, as discussed further below in conjunction with FIGS. 2 and 3, for example. The customer service ticket generation and criticality classification module 114 assigns a similarity score to each customer service ticket, as discussed further below in conjunction with FIGS. 2 and 5, for example. The customer service ticket criticality assessment module 116 updates pairwise similarity values for at least some of the customer service tickets using feedback from a user and generates an updated encoding model, as discussed further below in conjunction with FIGS. 3 through 5, for example.

The customer service ticket processing server 105 may be implemented, at least in part, using an STS, as would be apparent to a person of ordinary skill in the art.

It is to be appreciated that this particular arrangement of elements 112, 114 and 116 illustrated in the customer service ticket processing server 105 of the FIG. 1 embodiment is presented by way of example only, and alternative arrangements can be used in other embodiments. For example, the functionality associated with elements 112, 114 and 116 in other embodiments can be combined into a single element, or separated across a larger number of elements. As another example, multiple distinct processors can be used to implement different ones of elements 112, 114 and 116 or portions thereof.

At least portions of elements 112, 114 and 116 may be implemented at least in part in the form of software that is stored in memory and executed by a processor. An exemplary process utilizing elements 112, 114 and 116 of the customer service ticket processing server 105 in computer network 100 will be described in more detail with reference to FIGS. 3 through 6.

Other customer service ticket processing servers 105 (not shown in FIG. 1), if any, are assumed to be configured in a manner similar to that shown for customer service ticket processing server 105 in the figure.

The customer service ticket processing server 105 may be implemented, for example, on the cloud, such as a private cloud, or on the premises of an enterprise or another entity. In some embodiments, the customer service ticket processing server 105, or portions thereof, may be implemented as part of a host device.

Additionally, the customer service ticket processing server 105 can have an associated customer service ticket database 106 configured to store, for example, information related to one or more customer service tickets, as discussed further below. In some embodiments, the customer service ticket database 106 is configured to store and record various information that is utilized by the customer service ticket processing server 105 for processing issues related to one or more of the IT assets 109 (and possibly the user devices 103) that are potentially affected by one or more issues. The customer service ticket database 106, for example, may store issue patterns or signatures, as well as asset signatures (e.g., for respective ones of the IT assets 109 and/or user devices 103, for groups of two or more of the IT assets 109 and/or user devices 103), etc. The customer service ticket database 106 may further store or record information relating to remediation actions (e.g., remediation scripts) for different issues, as well as feedback regarding the effectiveness of different remediation actions for different issues. In some embodiments, one or more of the storage systems utilized to implement the customer service ticket database 106 may comprise a scale-out all-flash content addressable storage array or other type of storage array.

The customer service ticket database 106 in the present embodiment is implemented using one or more storage systems associated with the one or more customer service ticket processing servers 105. Such storage systems can comprise any of a variety of different types of storage such as, network-attached storage (NAS), storage area networks (SANs), direct-attached storage (DAS) and distributed DAS, as well as combinations of these and other storage types, including software-defined storage.

The one or more user devices 103 and/or customer service ticket processing servers 105 may be implemented on a common processing platform, or on separate processing platforms. The one or more user devices 103 may be configured to interact over the network 104 in at least some embodiments with the one or more customer service ticket processing servers 105, for example.

The term "processing platform" as used herein is intended to be broadly construed so as to encompass, by way of illustration and without limitation, multiple sets of processing devices and associated storage systems that are configured to communicate over one or more networks. For example, distributed implementations of the system 100 are possible, in which certain components of the system reside in one data center in a first geographic location while other components of the system reside in one or more other data centers in one or more other geographic locations that are potentially remote from the first geographic location. Thus, it is possible in some implementations of the system 100 for the user devices 103 and/or customer service ticket processing servers 105 to reside in different data centers. Numerous other distributed implementations of the host devices and the storage system are possible.

The network 104 is assumed to comprise a portion of a global computer network such as the Internet, although other types of networks can be part of the computer network 100, including a wide area network (WAN), a local area network (LAN), a satellite network, a telephone or cable network, a cellular network, a wireless network such as a Wi-Fi or WiMAX network, or various portions or combinations of these and other types of networks. The computer network 100 in some embodiments therefore comprises combinations of multiple different types of networks, each comprising processing devices configured to communicate using internet protocol (IP) or other related communication protocols.

Also associated with the one or more user devices 103 and/or customer service ticket processing servers 105 can be one or more input-output devices (not shown), which illustratively comprise keyboards, displays or other types of input-output devices in any combination. Such input-output devices can be used, for example, to support one or more user interfaces to the customer service ticket processing servers 105, as well as to support communication between the customer service ticket processing servers 105 and other related systems and devices not explicitly shown.

The one or more user devices 103 and/or customer service ticket processing servers 105 in the FIG. 1 embodiment are assumed to be implemented using at least one processing device. Each such processing device generally comprises at least one processor and an associated memory, and implements one or more functional modules for controlling certain features of the respective device.

More particularly, the one or more user devices 103 and/or customer service ticket processing servers 105 in this embodiment each can comprise a processor coupled to a memory and a network interface.

The processor illustratively comprises a microprocessor, a microcontroller, an application-specific integrated circuit (ASIC), a field-programmable gate array (FPGA) or other type of processing circuitry, as well as portions or combinations of such circuitry elements.

The memory illustratively comprises RAM, read-only memory (ROM) or other types of memory, in any combination. The memory and other memories disclosed herein may be viewed as examples of what are more generally referred to as "processor-readable storage media" storing executable computer program code or other types of software programs.

One or more embodiments include articles of manufacture, such as computer-readable storage media. Examples of an article of manufacture include, without limitation, a storage device such as a storage disk, a storage array or an integrated circuit containing memory, as well as a wide variety of other types of computer program products. The term "article of manufacture" as used herein should be understood to exclude transitory, propagating signals. These and other references to "disks" herein are intended to refer generally to storage devices, including SSDs, and should therefore not be viewed as limited in any way to spinning magnetic media.

The network interface allows the one or more user devices 103 and/or customer service ticket processing servers 105 to communicate in some embodiments over the network 104 with each other (as well as one or more other networked devices), and illustratively comprises one or more conventional transceivers.

It is to be understood that the particular set of elements shown in FIG. 1 for evaluating criticality classifications of customer service tickets using a binary classification model is presented by way of illustrative example only, and in other embodiments additional or alternative elements may be used. Thus, another embodiment includes additional or alternative systems, devices and other network entities, as well as different arrangements of modules and other components.

Text encoding (e.g., word encoding and sentence encoding) approaches are typical of natural language processing tasks in machine learning literature. These approaches allow numerical representations of textual tokens (e.g., words) in vector form such that similar words are closer in the vector space. A number of text encoding techniques are available. Doc2vec, for example, is based on the word2vec approach and requires no explicit labeling. Doc2vec relies on distributional semantics and obtains, from a corpus of texts, numeric representations of documents.

Figure 2:
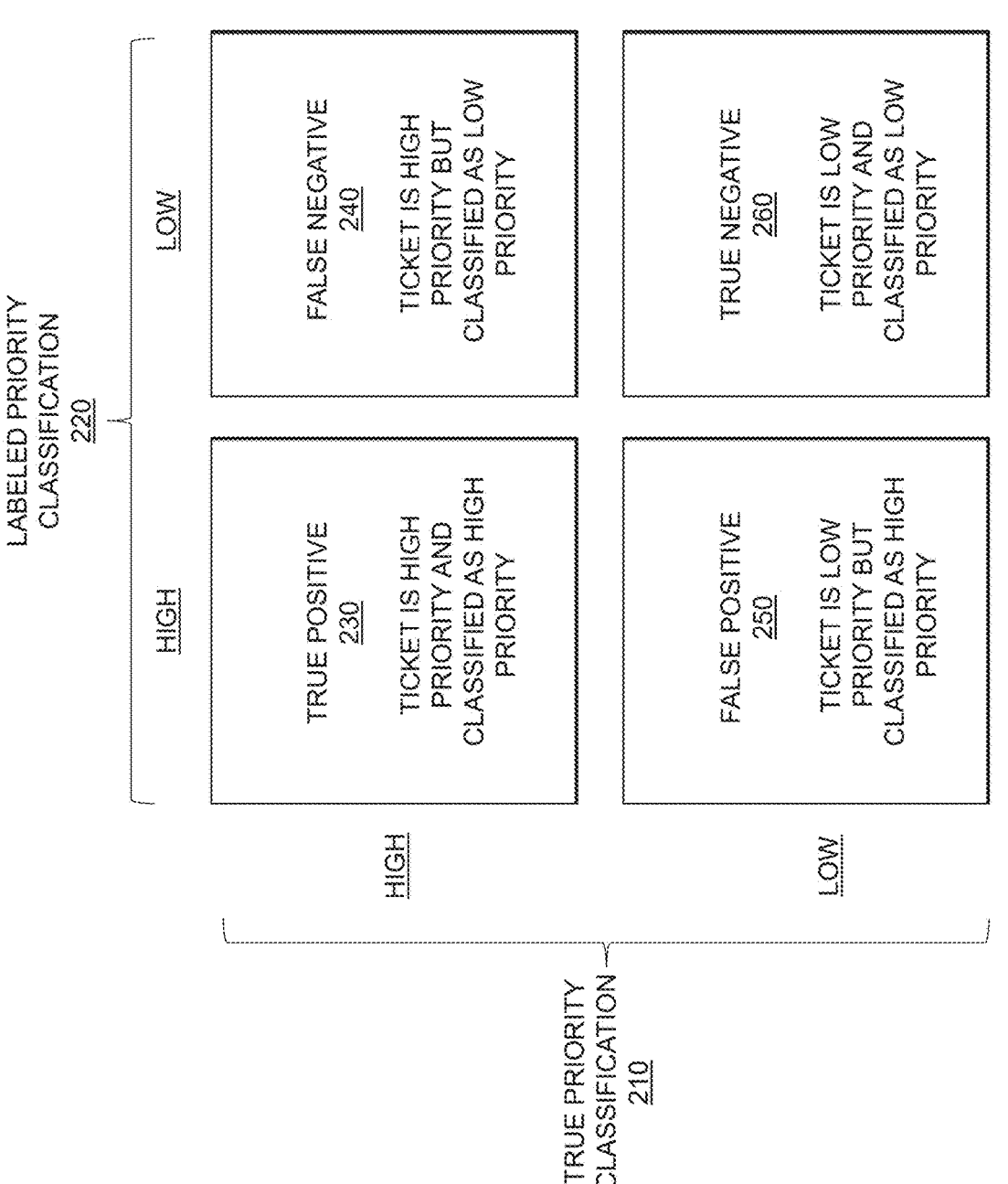
FIG. 2 illustrates a true classification and a labeled classification of customer service tickets in an illustrative embodiment.

FIG. 2 is a matrix illustrating a true priority classification 210 of customer service tickets and a labeled priority classification 220 of customer service tickets in an illustrative embodiment. In the example of FIG. 2, customer service tickets or other items with a true positive classification 230 comprise items (e.g., customer service tickets) that have a high priority and are classified with a high priority. Items with a false negative classification 240 comprise items that have a high priority but are classified with a low priority. Items with a false positive classification 250 comprise items that have a low priority but are classified with a high priority. Items with a true negative classification 260 comprise items that have a low priority and are classified with a low priority.

In one or more embodiments, the disclosed framework for evaluating criticality classifications of customer service tickets and other items aim to identity items with a false positive classification 250 that are likely false positives but are classified as high priority items (and reduce the priority of such identified items in an appropriate manner). In other words, customer service tickets and other items are identified that should not have been labeled as a high priority item. In addition, the disclosed framework for evaluating criticality classifications of customer service tickets and other items aims to avoid introducing any false negative classifications 240 (e.g., the disclosed techniques should not flag a real high priority item as a false positive item).

Figure 3:
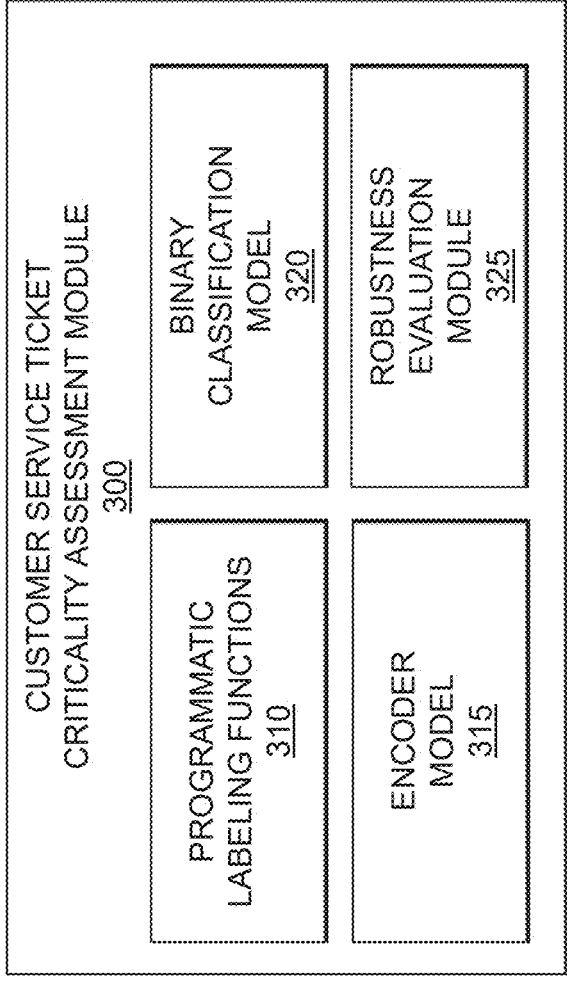
FIG. 3 illustrates the customer service ticket criticality assessment module of FIG. 1 in further detail in an illustrative embodiment.

FIG. 3 is a block diagram illustrating the customer service ticket criticality assessment module of FIG. 1 in further detail, in an illustrative embodiment. In the example of FIG. 3, an exemplary customer service ticket criticality assessment module 300 comprises programmatic labeling functions 310, an encoder model 315, a binary classification model 320 and a robustness evaluation module 325, each discussed further below in conjunction with FIG. 5, for example.

Generally, in one or more embodiments, the programmatic labeling functions 310 may comprise one or more labeling functions that can be applied to customer service tickets to obtain labeled high priority customer service ticket items to be processed using the disclosed techniques. The encoder model 315, in some embodiments, may generate reduced dimension encoding vectors of such customer service tickets for further processing by the binary classification model 320. The binary classification model 320 may learn to separate such encoding vectors of actual high priority customer service tickets from false positive customer service tickets. The robustness evaluation module 325 may aim to avoid false positives in the candidate customer service tickets. In other words, the robustness evaluation module 325 should not act to deprioritize a true high priority item.

It is to be appreciated that this particular arrangement of elements 310, 315, 320 and/or 325 illustrated in the customer service ticket criticality assessment module 300 of the FIG. 1 embodiment is presented by way of example only, and alternative arrangements can be used in other embodiments. For example, the functionality associated with elements 310, 315, 320 and/or 325 in other embodiments can be combined into a single element, or separated across a larger number of elements. As another example, multiple distinct processors can be used to implement different ones of elements 310, 315, 320 and/or 325 or portions thereof.

At least portions of elements 310, 315, 320 and/or 325 may be implemented at least in part in the form of software that is stored in memory and executed by a processor. An exemplary process utilizing elements 310, 315, 320 and/or 325 of the customer service ticket processing server 105 in computer network 100 will be described in more detail with reference to FIGS. 4 through 6, for example.

Figure 4:
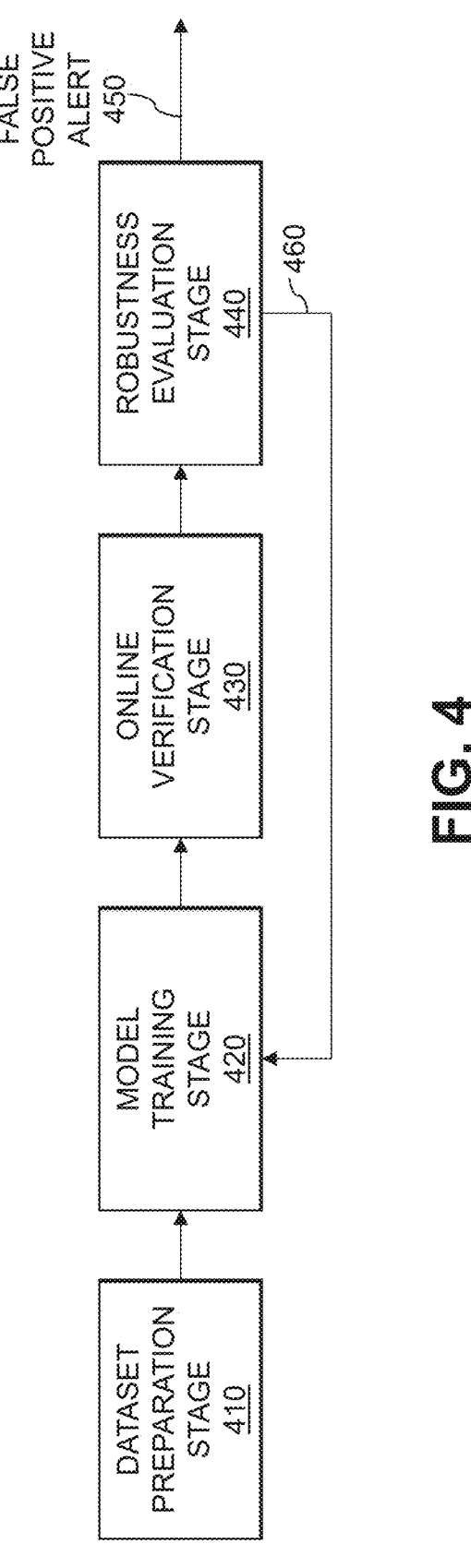
FIGS. 4 and 5 are flow diagrams illustrating exemplary implementations of processes for evaluating criticality classifications of customer service tickets using a binary classification model and a validation of similar customer service tickets in accordance with an illustrative embodiment.

FIG. 4 is a flow diagram illustrating an exemplary implementation of a process for evaluating criticality classifications of customer service tickets using a binary classification model, according to one embodiment of the disclosure. In the example of FIG. 4, the process comprises a dataset preparation stage 410, a model training stage 420, an online verification stage 430 and a robustness evaluation stage 440, each discussed further below in conjunction with FIG. 5, for example.

In one or more embodiments, the dataset preparation stage 410 comprises a preprocessing step that obtains a dataset comprising true and false positive cases of high priority tickets. The model training stage 420 may process the obtained dataset from the dataset preparation stage 410 to an encoder model and a binary classifier model (not shown in FIG. 4) that are fine-tuned to detect candidate false positive customer service tickets. The online verification stage 430 deploys the trained encoder and binary classifier models to obtain a first indication that a new customer service ticket is a candidate false positive customer service ticket. The robustness evaluation stage 440 may be triggered by one or more candidate false positive customer service tickets and leverages similarity between such candidate false positive customer service tickets and other resolved (recent) high priority customer service tickets to ensure a conservative approach (e.g., avoiding false negatives as much as possible). An output of the robustness evaluation stage 440 may comprise a false positive alert 450 (e.g., that may trigger one or more automated actions, discussed further below).

The process of FIG. 4 also provides a feedback path 460 from the robustness evaluation stage 440 to initiate a retraining of the encoder model and/or the binary classifier model during a new execution of the model training stage 420.

Figure 5:
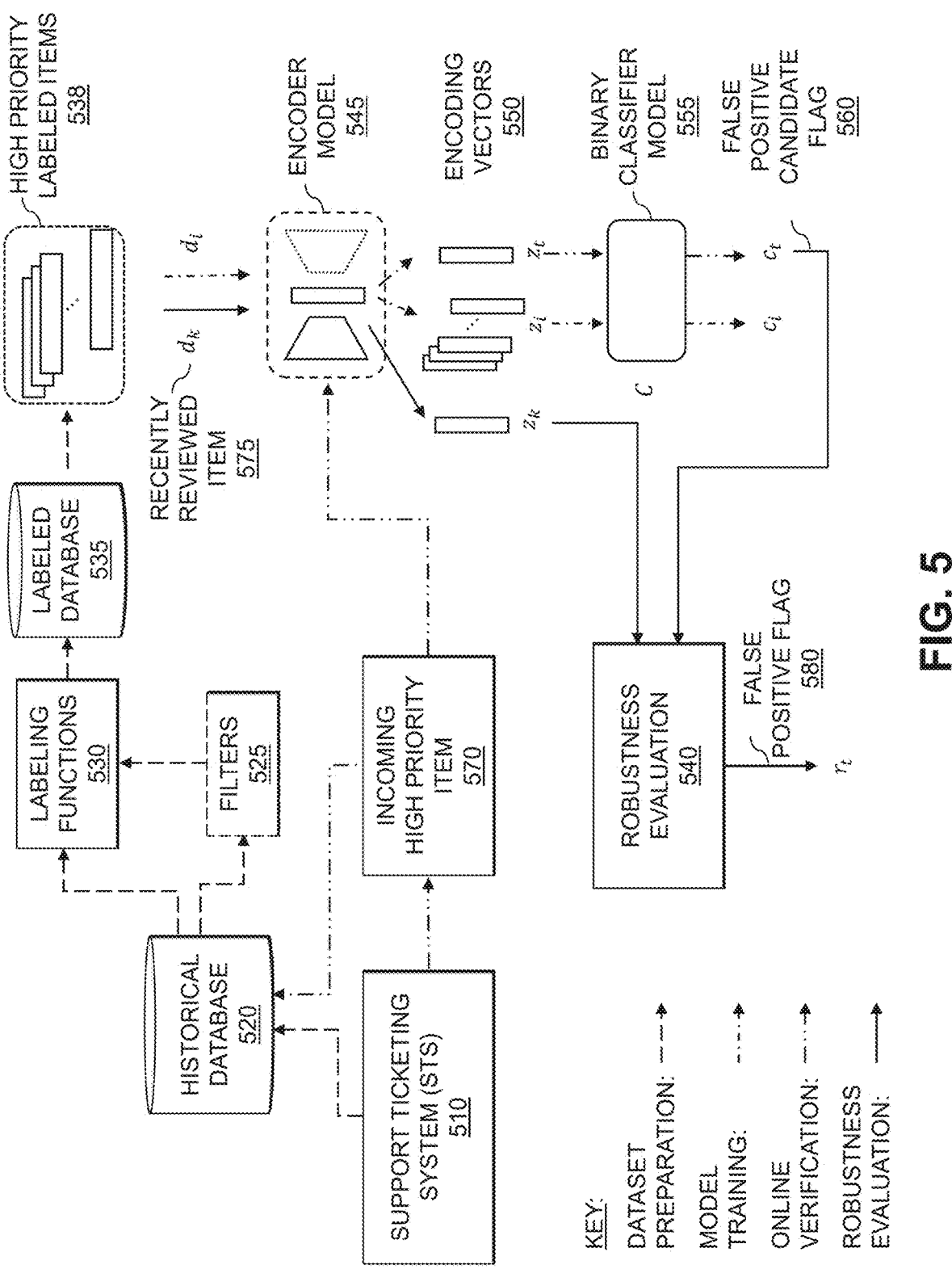

FIG. 5 is a flow diagram illustrating an exemplary implementation of a process for evaluating criticality classifications of customer service tickets using a binary classification model, according to one embodiment of the disclosure. In the example of FIG. 5, the various stages of FIG. 4 (e.g., dataset preparation, model training, online verification and robustness evaluation) are differentiated using different dash patterns, as indicated by the key provided in FIG. 5.

In some embodiments of a dataset preparation phase, an STS 510 produces a historical database 520 of previously processed customer service ticket items. The historical customer service tickets may be directly applied to a set of labeling functions 530, or a reduced set of historical customer service tickets may be generated by a set of filters 525 before being applied to the labeling functions 530.

The filters 525 may filter the historical customer service tickets for relevant items (for example, using custom filter procedures) to obtain a reduced set of historical customer service tickets comprising candidate customer service ticket items. Given that the historical database 520 may be sizeable, the tickets may optionally be filtered to identify the most relevant items (e.g., especially when long term customer service tickets are maintained, in which case filtering the historical customer service ticket items for recency (such as the most recent N months) may be desirable).

In some embodiments, the filters 525 may comprise one or more filtering procedures that may be defined for obtaining the reduced set of historical customer service tickets that are relevant for the task of high priority classification. Custom filtering procedures replaying the traces of individual customer service tickets in the historical database 520 may yield additional annotations. The individual history of each ticket may be leveraged, considering those customer service tickets that were marked as high priority but either initially or conclusively were determined to not be high priority customer service tickets. The same filters (including the replaying processes) can be periodically triggered to assess whether new customer service tickets are eligible for the labeled dataset.

In one or more embodiments, the labeling functions 530 may be applied to the customer service tickets to obtain an augmented set of labeled high priority customer service ticket items. Remaining unlabeled candidate items may be annotated by a self-supervised process of programmatic labeling, yielding a labeled database 535 of high priority customer service ticket items. Programmatic labeling is a data centric approach to increase the quality of automatic labeling by using labeling functions and a small portion of true labels (or even no labels) to label observations at scale in a traceable way. In addition, the employed programmatic labeling approach may review one or more of the labeling functions over time (e.g., periodically).

In the example of FIG. 5, the labeling functions 530 may be heuristics created, for example, by subject matter experts or trained models. The labeling functions 530 are applied to the full set of historical customer service tickets or the reduced set of historical customer service tickets generated by the filters 525. The labeling functions 530 generate a labeled set of historical customer service tickets that are stored in the labeled database 535.

A labeling function 530 can be a heuristic, such as:

$$\text{Label} = \begin{cases} \text{Class, if condition is True} \\ \text{Abstain, otherwise} \end{cases}.$$

Such a labeling function 530 can be an output of a trained model (for example, using semi or weak supervision), or a query from a database (using distant supervision). Generally, the labeling functions 530 aim to leverage human knowledge in a scalable way by writing a set of labeling rules (e.g., that may require a fraction of the effort of human revision for every customer service ticket item in the dataset). These labeling rules can then be automatically applied to the customer service ticket items, determining the labels for customer service ticket items that were otherwise not labeled by a person. The labeling functions 530 may help discover customer service ticket items that were false positive, high priority customer service tickets but had not been labeled as such by a human operator.

The labeled customer service tickets in the labeled database 535 may be used to train an encoder model 545 and a binary classifier model 555. In addition, the historical database 520 is assumed to store incoming high priority customer service ticket item 570, as discussed further below, during operation. An API connected to the STS 510 can gather customer service ticket information along with labels gathered from operators. The customer service tickets may be associated with human annotation and contain trace data (e.g., changes to the status and/or the priority of the customer service tickets may be recorded and maintained following updates).

The labeled database 535 comprises a dataset of high priority labeled items 538 that may contain a sufficient number of false positive tickets (e.g., items that were labeled as high priority customer service tickets but, upon human inspection, were demoted). In many cases, however, it may be necessary to augment the available set of such customer service tickets to enable the training of the encoder model 545 and the binary classifier model 555. For example, a self-supervised annotation process may be employed, as discussed below.

The encoder model 545 generates reduced dimension encoding vectors 550 of the customer service ticket items and may be implemented as one or more autoencoders (e.g., one or more deep neural networks that learn to compress and decompress high dimensional data, where an autoencoder comprises a network of dimensionality-reducing encoder layers and dimensionality-increasing decoder layers). See, for example, D. E. Rumelhard et al., "Learning Representations by Back-Propagating Errors," Cognitive Modeling, Vol. 5, No. 3, 1998, incorporated by reference herein. The autoencoder network is able to find non-linear patterns that decrease (e.g., encode) and then increase (e.g., decode) the dimensionality of the customer service ticket data so as to reconstruct the original data.

Autoencoders can learn by themselves how to compress the data using only information coming from the data (e.g., in an unsupervised manner). The encoder layers, when used in isolation, result in compressed data Z. Therefore, each datum $X_i$ that passes through an encoder model 545 will lead to a latent encoding vector $Z_i$ (550) that when passed through a decoder will lead to a decompressed datum $$X_i'.$$

In an autoencoder, $X_i$ typically represents an original data sample i. An encoder element $f_{\theta_e}(x)$ reduces the input to an encoded latent space as $Z_i$. The decoder $g_{\theta_d}(z)$ reconstructs the data to the original input dimensions. The resulting reconstructed data $$X_i'.$$

is the output of the network. In this formulation, $\theta$ may determine the parametrization of the network; with $\theta_e$ and $\theta_d$ referring to the encoding and decoding parameters, respectively.

In a model training phase, each of the customer service ticket items $d_i$ in the labeled database is provided as input to the training of an encoder model Z (545), producing a corresponding encoding vector $z_i$. These encoding vectors and the ground-truth labels are used to train a binary classifier C (555) that yields a binary classification $\{0, 1\}$ that indicates a false positive in high criticality. In at least some embodiments, a value of 1 indicates a likelihood that the customer service ticket is a high priority ticket; and a value of 0 indicates that the customer service ticket is not a high priority customer service ticket (i.e., items with a classification $c_i$ that is close to zero are considered as probable false positives customer service tickets). Generally, the binary classifier C (555) learns how to separate encoding vectors 550 of actual high priority customer service ticket items from false positive customer service ticket items. For the training of the binary classifier model 555, it may be necessary to generate a substantial portion of "negative cases" (e.g., to take non high priority customer service ticket items from the historical database 520, encode them with the encoder model 545, and provide those encoding vectors 550 as examples of "false positives" for the training process (e.g., such customer service ticket items may not be part of the labeled database 535 used for the training of the encoder model 545).

In an online verification phase, as the STS 510 (S) produces a new customer service ticket item t, the encoder model 545 and the binary classifier model 555 are leveraged to obtain $c_t$, a false positive candidate flag 560 that indicates that new customer service ticket item t is possibly misattributed with high criticality. The encoder model 545 and the binary classifier model 555 are deployed to an appropriate computational environment. The task is to receive a new incoming customer service ticket item t that was flagged as high priority and "intercept" the new incoming customer service ticket item t before human revision. In some embodiments, to avoid any added delays in the treatment of actual high priority items, the online verification phase takes place relatively fast.

The encoding $z_t$ of the new customer service ticket item t is obtained. As noted above, only the encoding part of the autoencoder model may be used in some embodiments (allowing encodings of a large number of customer service tickets to be generated per second, for example). The encoding $z_t$ of the new customer service ticket item t is provided as input to the binary classifier model 555 and an output between 0 and 1 is obtained. The output is compared to a strict relevance threshold (typically close to 0.1) that ensures that only items that the binary classifier model 555 classified as a false positive with high confidence are considered.

In a robustness evaluation phase 540, a false positive candidate flag $c_t$ (560) triggers the robustness step. The robustness evaluation phase 540 aims to avoid, as much as reasonably possible, any false positives in the candidate customer service tickets. That is, the disclosed techniques for evaluating criticality classifications of customer service tickets using binary classification model should not act to deprioritize a true high priority item.

The recently reviewed high priority ticket items, $d_k$, (575) are retrieved from the high priority labeled items 538 from the labeled database 535, prioritizing those customer service tickets that have been reviewed by humans or another designated validation process. The encoding za of each recently reviewed high priority ticket item, $d_k$, (575) is computed, and the encoding $z_i$ of the incoming high priority customer service ticket item t (570) is compared to $z_k$ for a similarity score. Thus, the encodings $z_k$ of recently reviewed high priority ticket items, $d_k$, (575) represent customer service tickets that were assigned a high priority, were reviewed by a human reviewer (or another designated validation process) and are very similar to the incoming high priority customer service ticket item t (570). If all items k∈K were labeled as false positives by human revision, there is a high confidence that the same must be true for the incoming high priority customer service ticket item t (570). In this manner, a new customer service ticket may be defined as a false positive customer service ticket and to take immediate automated action (e.g., to automatically deprioritize the incoming high priority customer service ticket item t (570)).

In some embodiments, the encodings $z_k$ of recently reviewed high priority ticket items, $d_k$, (575) that were not reviewed by a human reviewer (or another designated validation process) may be collected as a secondary set and prioritized for review.

The system considers whether any recent human reviewed high priority customer service ticket item, $d_k$, (575) is similar to the incoming high priority customer service ticket item t (570) (e.g., using a strict threshold of similarity). In at least some embodiments, if and only if $z_k$ was reviewed as a false positive customer service ticket, then a false positive flag 580, $r_t$, is returned as true, indicating that the incoming high priority customer service ticket item t (570) is also a false positive. Otherwise, the robustness checks are indeterminate and the high priority customer service ticket item t (570) is not flagged as a false positive.

In addition, customer service tickets may be collected for the continuous retraining of the encoder model 545 and/or the binary classifier model 555. It is noted that even when the robustness check does not flag the customer service ticket item, the intermediate results (e.g., the corresponding false positive candidate flags 560) may be stored for later revision (which can be leveraged for triggering the retraining of the encoder model 545 and/or the binary classifier model 555). For example, an eventual human annotation of a given false positive candidate flag 560 may be related to the stored given false positive candidate flag 560.

In one or more embodiments, the number of new available labeled examples may be monitored over time. When the monitored number satisfies a designated retraining criteria (e.g., becomes a relevant proportion of the total available samples in the labeled database 535, originating from the filters 525 and/or the labeling functions 530) a retraining of the encoder model 545 and/or the binary classifier model 555 may be initiated. In another possible embodiment, the revisions of a given customer service ticket (e.g., validation of a false positive customer service ticket) by a human reviewer may be propagated to similar customer service tickets to produce additional labeled samples in the labeled database 535. In this manner, a new labeled dataset in the labeled database 535 becomes available and may trigger the retraining of the encoder model 545 and/or the binary classifier model 555, in the manner described above.

FIG. 6 is a flow diagram illustrating an exemplary implementation of a process 600 for evaluating criticality classifications of items using a binary classification model in accordance with an illustrative embodiment. In the example of FIG. 6, information characterizing at least one item having at least one designated criticality classification (e.g., high priority items) is obtained in step 610.

In step 620, at least a portion of the information characterizing the at least one item is applied to an encoder that generates an encoded vector characterizing the at least one item. The encoded vector characterizing the at least one item may be applied in step 630 to at least one processor-based binary classification model in step 630, wherein the processor-based binary classification model identifies one or more candidate false positive items, having the at least one designated criticality classification, as candidate false positive classifications. In various embodiments, the at least one processor-based binary classification model may be implemented using a neural network and/or a decision tree.

At least one of the one or more candidate false positive items may be evaluated in step 640, by performing the following steps, using at least one processing device:

obtaining a plurality of encoded vectors characterizing respective ones of a plurality of previously processed items having the at least one designated criticality classification;

comparing the encoded vector characterizing the at least one candidate false positive item to the encoded vectors characterizing the respective ones of the plurality of previously processed items, having the at least one designated criticality classification, to obtain respective similarity scores;

identifying at least one of the encoded vectors characterizing the respective ones of the plurality of previously processed items having a similarity score, with respect to the encoded vector characterizing the at least one candidate false positive item, that satisfies one or more similarity criteria; and determining whether a classification of a given previously processed item, associated with the at least one encoded vector having the similarity score that satisfies the one or more similarity criteria, was validated, by a designated validation process, with a false positive classification.

In step 650, at least one automated action may be initiated based at least in part on a result of the evaluating of step 640.

In one or more embodiments, the process of FIG. 6 may also comprise labeling the at least one item with the at least one designated criticality classification. The labeling the at least one item may be based at least in part on one or more rules incorporating human knowledge to discover. The at least one designated criticality classification may comprise a high priority label. The encoder may comprise an encoding layer of an autoencoder.

In one embodiment, the at least one item may comprise at least one customer service ticket and the at least one customer service ticket may be labeled with the at least one designated criticality classification by a customer service ticketing system. As used herein, the term "customer service ticket" shall be broadly construed to encompass service data structures, transaction data structures, interaction data structures and other data structures that record information obtained regarding interactions with or on behalf of a user, such as a customer. For example, such customer service tickets may be generated in the context of a CI/CD (continuous integration and continuous delivery/deployment) system, an IT ticket generation system and other scenarios where high priority cases are generated.

In at least some embodiments, the at least one automated action comprises one or more of: classifying the at least one candidate false positive item as a false positive classification in response to the determining indicating that the classification of the given previously processed item, associated with the at least one encoded vector having the similarity score that satisfies the one or more similarity criteria, was validated with the false positive classification; classifying the at least one candidate false positive item with an indeterminate classification in response to the determining indicating that the classification of the given previously processed item, associated with the at least one encoded vector having the similarity score that satisfies the one or more similarity criteria, was not validated with the false positive classification; and/or assigning at least one of the one or more candidate false positive items to a set of items requiring a manual review.

In some embodiments, the process of FIG. 6 may also comprise filtering a set of previously processed items having the at least one designated criticality classification based at least in part on one or more of a recency and a relevance with respect to the at least one item to obtain the plurality of previously processed items having the at least one designated criticality classification. The process of FIG. 6 may further comprise retraining the at least one processor-based binary classification model in response to a designated amount of labeled items being available.

In at least one embodiment, the at least one binary classification model may be trained to determine a likelihood of a given item, having the at least one designated criticality classification, being a false positive. The designated validation process may comprise at least one human reviewer validating the given previously processed item, associated with the at least one encoded vector having the similarity score that satisfies the one or more similarity criteria, as being a false positive classification.

The particular processing operations and other functionality described in conjunction with FIGS. 4 through 6, for example, are presented by way of illustrative example only, and should not be construed as limiting the scope of the disclosure in any way. Alternative embodiments can use other types of processing operations for evaluating criticality classifications of items using a binary classification model. For example, the ordering of the process steps may be varied in other embodiments, or certain steps may be performed concurrently with one another rather than serially. In one aspect, the process can skip one or more of the actions. In other aspects, one or more of the actions are performed simultaneously. In some aspects, additional actions can be performed.

In this manner, in one or more embodiments, the disclosed item ticket criticality evaluation techniques find relationships within the previously processed item data so that new incidents are solved more efficiently by leveraging previous solutions. The disclosed item criticality evaluation approach does not require any particular specific set of fields, and is adaptable to any number of fields, such as message and/or note fields that are typically present in such systems.

In at least some embodiments, the disclosed item criticality evaluation methodology identifies previously processed items that have already been closed with a solution by encoding the item description and searching for similarities in the encoded space. The most similar previous items can be provided, for example, in a ranked manner, for review by a human operator or another validation process. The review and analysis of the human operator is then leveraged to fine-tune the weights of the encoding process for future support issues.

The disclosed item criticality evaluation framework suggests previous items that are similar to a new item without the need for any initial supervised dataset. The framework then leverages available human revision (e.g., feedback from the user indicating whether prior results were accurate), resulting from normal operation guided by the disclosed approach, to adjust the weights of the features in the similarity metric.

One or more embodiments of the disclosure provide improved methods, apparatus and computer program products for evaluating criticality classifications of items, such as customer service tickets, using a binary classification model and a validation of similar items. The foregoing applications and associated embodiments should be considered as illustrative only, and numerous other embodiments can be configured using the techniques disclosed herein, in a wide variety of different applications.

It should also be understood that the disclosed item criticality evaluation techniques, as described herein, can be implemented at least in part in the form of one or more software programs stored in memory and executed by a processor of a processing device such as a computer. As mentioned previously, a memory or other storage device having such program code embodied therein is an example of what is more generally referred to herein as a "computer program product."

The disclosed item criticality evaluation techniques may be implemented using one or more processing platforms. One or more of the processing modules or other components may therefore each run on a computer, storage device or other processing platform element. A given such element may be viewed as an example of what is more generally referred to herein as a "processing device."

As noted above, illustrative embodiments disclosed herein can provide a number of significant advantages relative to conventional arrangements. It is to be appreciated that the particular advantages described above and elsewhere herein are associated with particular illustrative embodiments and need not be present in other embodiments. Also, the particular types of information processing system features and functionality as illustrated and described herein are exemplary only, and numerous other arrangements may be used in other embodiments.

In these and other embodiments, compute services can be offered to cloud infrastructure tenants or other system users as a PaaS offering, although numerous alternative arrangements are possible.

Some illustrative embodiments of a processing platform that may be used to implement at least a portion of an information processing system comprise cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as a cloud-based item criticality evaluation engine, or portions thereof, are illustratively implemented for use by tenants of such a multi-tenant environment.

Cloud infrastructure as disclosed herein can include cloud-based systems. Virtual machines provided in such systems can be used to implement at least portions of a cloud-based item criticality evaluation platform in illustrative embodiments. The cloud-based systems can include object stores.

In some embodiments, the cloud infrastructure additionally or alternatively comprises a plurality of containers implemented using container host devices. For example, a given container of cloud infrastructure illustratively comprises a Docker container or other type of Linux Container (LXC). The containers may run on virtual machines in a multi-tenant environment, although other arrangements are possible. The containers may be utilized to implement a variety of different types of functionality within the storage devices. For example, containers can be used to implement respective processing devices providing compute services of a cloud-based system. Again, containers may be used in combination with other virtualization infrastructure such as virtual machines implemented using a hypervisor.

Illustrative embodiments of processing platforms will now be described in greater detail with reference to FIGS. 7 and 8. These platforms may also be used to implement at least portions of other information processing systems in other embodiments.

Figure 7:
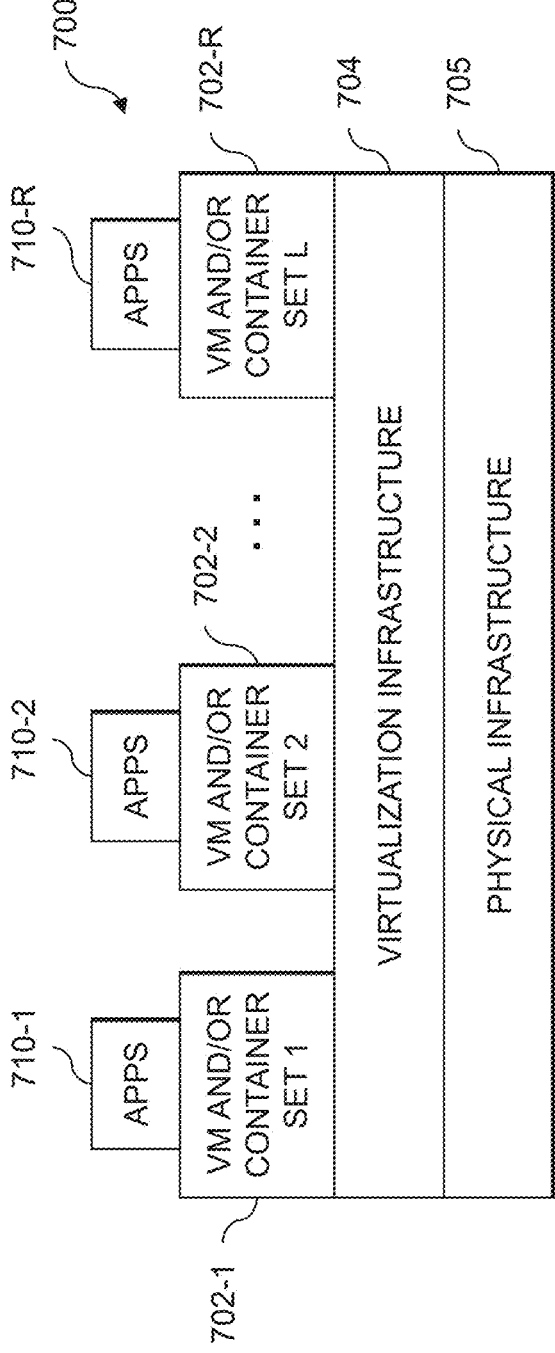
FIG. 7 illustrates an exemplary processing platform that may be used to implement at least a portion of one or more embodiments of the disclosure comprising a cloud infrastructure.

FIG. 7 shows an example processing platform comprising cloud infrastructure 700. The cloud infrastructure 700 comprises a combination of physical and virtual processing resources that may be utilized to implement at least a portion of the information processing system 100. The cloud infrastructure 700 comprises multiple virtual machines (VMs) and/or container sets 702-1, 702-2, . . . 702-R implemented using virtualization infrastructure 704. The virtualization infrastructure 704 runs on physical infrastructure 705, and illustratively comprises one or more hypervisors and/or operating system level virtualization infrastructure. The operating system level virtualization infrastructure illustratively comprises kernel control groups of a Linux operating system or other type of operating system.

The cloud infrastructure 700 further comprises sets of applications 710-1, 710-2, . . . 710-R running on respective ones of the VMs/container sets 702-1, 702-2, . . . 702-R under the control of the virtualization infrastructure 704. The VMs/container sets 702 may comprise respective VMs, respective sets of one or more containers, or respective sets of one or more containers running in VMs.

In some implementations of the FIG. 7 embodiment, the VMs/container sets 702 comprise respective VMs implemented using virtualization infrastructure 704 that comprises at least one hypervisor. Such implementations can provide ticket criticality evaluation functionality of the type described above for one or more processes running on a given one of the VMs. For example, each of the VMs can implement item criticality evaluation control logic and associated similar previously processed item identification functionality for one or more processes running on that particular VM.

An example of a hypervisor platform that may be used to implement a hypervisor within the virtualization infrastructure 704 is a compute virtualization platform which may have an associated virtual infrastructure management system such as server management software. The underlying physical machines may comprise one or more distributed processing platforms that include one or more storage systems.

In other implementations of the FIG. 7 embodiment, the VMs/container sets 702 comprise respective containers implemented using virtualization infrastructure 704 that provides operating system level virtualization functionality, such as support for Docker containers running on bare metal hosts, or Docker containers running on VMs. The containers are illustratively implemented using respective kernel control groups of the operating system. Such implementations can provide ticket criticality evaluation functionality of the type described above for one or more processes running on different ones of the containers. For example, a container host device supporting multiple containers of one or more container sets can implement one or more instances of ticket criticality evaluation control logic and associated similar previously processed item identification functionality.

As is apparent from the above, one or more of the processing modules or other components of system 100 may each run on a computer, server, storage device or other processing platform element. A given such element may be viewed as an example of what is more generally referred to herein as a "processing device." The cloud infrastructure 700 shown in FIG. 7 may represent at least a portion of one processing platform. Another example of such a processing platform is processing platform 800 shown in FIG. 8.

The processing platform 800 in this embodiment comprises at least a portion of the given system and includes a plurality of processing devices, denoted 802-1, 802-2, 802-3, . . . 802-K, which communicate with one another over a network 804. The network 804 may comprise any type of network, such as a WAN, a LAN, a satellite network, a telephone or cable network, a cellular network, a wireless network such as WiFi or WiMAX, or various portions or combinations of these and other types of networks.

The processing device 802-1 in the processing platform 800 comprises a processor 810 coupled to a memory 812. The processor 810 may comprise a microprocessor, a microcontroller, an ASIC, an FPGA or other type of processing circuitry, as well as portions or combinations of such circuitry elements, and the memory 812, which may be viewed as an example of a "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 802-1 is network interface circuitry 814, which is used to interface the processing device with the network 804 and other system components, and may comprise conventional transceivers.

The other processing devices 802 of the processing platform 800 are assumed to be configured in a manner similar to that shown for processing device 802-1 in the figure.

Again, the particular processing platform 800 shown in the figure is presented by way of example only, and the given system may include additional or alternative processing platforms, as well as numerous distinct processing platforms in any combination, with each such platform comprising one or more computers, storage devices or other processing devices.

Figure 8:
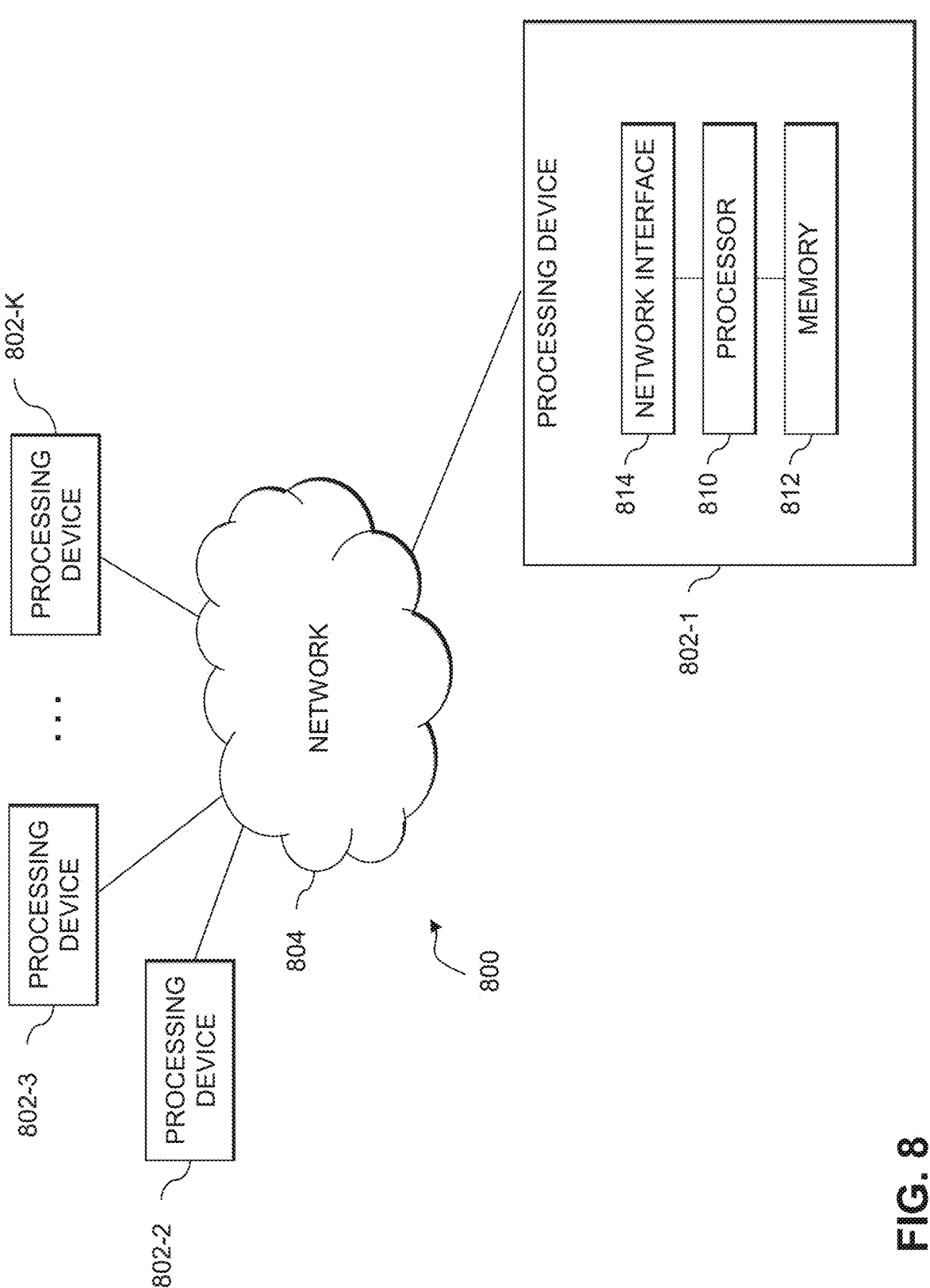
FIG. 8 illustrates another exemplary processing platform that may be used to implement at least a portion of one or more embodiments of the disclosure.

Multiple elements of an information processing system may be collectively implemented on a common processing platform of the type shown in FIG. 7 or 8, or each such element may be implemented on a separate processing platform.

For example, other processing platforms used to implement illustrative embodiments can comprise different types of virtualization infrastructure, in place of or in addition to virtualization infrastructure comprising virtual machines. Such virtualization infrastructure illustratively includes container-based virtualization infrastructure configured to provide Docker containers or other types of LXCs.

As another example, portions of a given processing platform in some embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality shown in one or more of the figures are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. A method, comprising:

accessing, using at least one processing device, one or more data structures comprising information characterizing at least one item having at least one designated criticality classification;

applying at least a portion of the information characterizing the at least one item to an encoder model that generates an encoded vector characterizing the at least one item;

applying the encoded vector characterizing the at least one item to at least one processor-based binary classification model, wherein the processor-based binary classification model identifies one or more candidate false positive items, having the at least one designated criticality classification, as candidate false positive classifications;

evaluating at least one of the one or more candidate false positive items, by performing the following steps, using the at least one processing device, wherein the evaluating is automatically performed by the at least one processing device responsive to an occurrence of at least one of the candidate false positive classifications:

obtaining a plurality of encoded vectors characterizing respective ones of a plurality of previously processed items having the at least one designated criticality classification;

comparing the encoded vector characterizing the at least one candidate false positive item to the encoded vectors characterizing the respective ones of the plurality of previously processed items, having the at least one designated criticality classification, to obtain respective similarity scores;

identifying at least one of the encoded vectors characterizing the respective ones of the plurality of previously processed items having a similarity score, with respect to the encoded vector characterizing the at least one candidate false positive item, that satisfies one or more similarity criteria; and determining whether a classification of a given previously processed item, associated with the at least one encoded vector having the similarity score that satisfies the one or more similarity criteria, was validated, by a designated validation process, with a false positive classification; and initiating at least one automated action based at least in part on a result of the evaluating, wherein the at least one automated action comprises one or more of:

classifying the at least one candidate false positive item as a false positive classification in response to the determining indicating that the classification of the given previously processed item, associated with the at least one encoded vector having the similarity score that satisfies the one or more similarity criteria, was validated with the false positive classification;

classifying the at least one candidate false positive item with an indeterminate classification in response to the determining indicating that the classification of the given previously processed item, associated with the at least one encoded vector having the similarity score that satisfies the one or more similarity criteria, was not validated with the false positive classification; and assigning at least one of one or more candidate false positive items to a set of items requiring a manual review;

wherein the at least one processing device comprises a processor coupled to a memory.

2. The method of claim 1, wherein further comprising labeling the at least one item with the at least one designated criticality classification.

3. The method of claim 2, wherein the labeling the at least one item is based at least in part on one or more rules incorporating human knowledge.

4. The method of claim 1, wherein the at least one item comprises at least one customer service ticket and wherein the at least one customer service ticket is labeled with the at least one designated criticality classification by a customer service ticketing system.

5. The method of claim 1, wherein the at least one designated criticality classification comprises a high priority label.

6. The method of claim 1, wherein the encoder model comprises an encoding layer of an autoencoder.

7. The method of claim 1, further comprising filtering a set of previously processed items having the at least one designated criticality classification based at least in part on one or more of a recency and a relevance with respect to the at least one item to obtain the plurality of previously processed items having the at least one designated criticality classification.

8. The method of claim 1, wherein the at least one processor-based binary classification model is trained to determine a likelihood of a given item, having the at least one designated criticality classification, being a false positive classification.

9. The method of claim 1, further comprising retraining the at least one processor-based binary classification model in response to a designated amount of labeled items being available.

10. The method of claim 1, wherein the designated validation process comprises at least one human reviewer validating the given previously processed item, associated with the at least one encoded vector having the similarity score that satisfies the one or more similarity criteria, as being a false positive classification.

11. An apparatus comprising:

at least one processing device comprising a processor coupled to a memory;

the at least one processing device being configured to implement the following steps:

accessing, using the at least one processing device, one or more data structures comprising information characterizing at least one item having at least one designated criticality classification;

applying at least a portion of the information characterizing the at least one item to an encoder model that generates an encoded vector characterizing the at least one item;

applying the encoded vector characterizing the at least one item to at least one processor-based binary classification model, wherein the processor-based binary classification model identifies one or more candidate false positive items, having the at least one designated criticality classification, as candidate false positive classifications;

evaluating at least one of the one or more candidate false positive items, by performing the following steps, using the at least one processing device, wherein the evaluating is automatically performed by the at least one processing device responsive to an occurrence of at least one of the candidate false positive classifications:

obtaining a plurality of encoded vectors characterizing respective ones of a plurality of previously processed items having the at least one designated criticality classification;

comparing the encoded vector characterizing the at least one candidate false positive item to the encoded vectors characterizing the respective ones of the plurality of previously processed items, having the at least one designated criticality classification, to obtain respective similarity scores;

identifying at least one of the encoded vectors characterizing the respective ones of the plurality of previously processed items having a similarity score, with respect to the encoded vector characterizing the at least one candidate false positive item, that satisfies one or more similarity criteria; and determining whether a classification of a given previously processed item, associated with the at least one encoded vector having the similarity score that satisfies the one or more similarity criteria, was validated, by a designated validation process, with a false positive classification; and initiating at least one automated action based at least in part on a result of the evaluating, wherein the at least one automated action comprises one or more of:

classifying the at least one candidate false positive item as a false positive classification in response to the determining indicating that the classification of the given previously processed item, associated with the at least one encoded vector having the similarity score that satisfies the one or more similarity criteria, was validated with the false positive classification;

classifying the at least one candidate false positive item with an indeterminate classification in response to the determining indicating that the classification of the given previously processed item, associated with the at least one encoded vector having the similarity score that satisfies the one or more similarity criteria, was not validated with the false positive classification; and assigning at least one of one or more candidate false positive items to a set of items requiring a manual review.

12. The apparatus of claim 11, wherein the at least one item comprises at least one customer service ticket and wherein the at least one customer service ticket is labeled with the at least one designated criticality classification by a customer service ticketing system.

13. The apparatus of claim 11, wherein the encoder model comprises an encoding layer of an autoencoder.

14. The apparatus of claim 11, wherein the at least one processor-based binary classification model is trained to determine a likelihood of a given item, having the at least one designated criticality classification, being a false positive classification.

15. The apparatus of claim 11, further comprising retraining the at least one processor-based binary classification model in response to a designated amount of labeled items being available.

16. A non-transitory processor-readable storage medium having stored therein program code of one or more software programs, wherein the program code when executed by at least one processing device causes the at least one processing device to perform the following steps:

accessing, using the at least one processing device, one or more data structures comprising information characterizing at least one item having at least one designated criticality classification;

applying at least a portion of the information characterizing the at least one item to an encoder model that generates an encoded vector characterizing the at least one item;

applying the encoded vector characterizing the at least one item to at least one processor-based binary classification model, wherein the processor-based binary classification model identifies one or more candidate false positive items, having the at least one designated criticality classification, as candidate false positive classifications;

evaluating at least one of the one or more candidate false positive items, by performing the following steps, using the at least one processing device, wherein the evaluating is automatically performed by the at least one processing device responsive to an occurrence of at least one of the candidate false positive classifications:

obtaining a plurality of encoded vectors characterizing respective ones of a plurality of previously processed items having the at least one designated criticality classification;

comparing the encoded vector characterizing the at least one candidate false positive item to the encoded vectors characterizing the respective ones of the plurality of previously processed items, having the at least one designated criticality classification, to obtain respective similarity scores;

identifying at least one of the encoded vectors characterizing the respective ones of the plurality of previously processed items having a similarity score, with respect to the encoded vector characterizing the at least one candidate false positive item, that satisfies one or more similarity criteria; and determining whether a classification of a given previously processed item, associated with the at least one encoded vector having the similarity score that satisfies the one or more similarity criteria, was validated, by a designated validation process, with a false positive classification; and initiating at least one automated action based at least in part on a result of the evaluating, wherein the at least one automated action comprises one or more of:

classifying the at least one candidate false positive item as a false positive classification in response to the determining indicating that the classification of the given previously processed item, associated with the at least one encoded vector having the similarity score that satisfies the one or more similarity criteria, was validated with the false positive classification;

classifying the at least one candidate false positive item with an indeterminate classification in response to the determining indicating that the classification of the given previously processed item, associated with the at least one encoded vector having the similarity score that satisfies the one or more similarity criteria, was not validated with the false positive classification; and assigning at least one of one or more candidate false positive items to a set of items requiring a manual review.

17. The non-transitory processor-readable storage medium of claim 16, wherein the at least one item comprises at least one customer service ticket and wherein the at least one customer service ticket is labeled with the at least one designated criticality classification by a customer service ticketing system.

18. The non-transitory processor-readable storage medium of claim 16, wherein the encoder model comprises an encoding layer of an autoencoder.

19. The non-transitory processor-readable storage medium of claim 16, further comprising retraining the at least one processor-based binary classification model in response to a designated amount of labeled items being available.

20. The non-transitory processor-readable storage medium of claim 16, wherein the at least one processor-based binary classification model is trained to determine a likelihood of a given item, having the at least one designated criticality classification, being a false positive classification.

* * * * *